(12) United States Patent
Stine

(10) Patent No.: US 10,240,850 B1
(45) Date of Patent: Mar. 26, 2019

(54) SUPPLEMENTAL REFRIGERATION HEAT SINK AND RELATED SYSTEMS AND METHODS

(71) Applicant: Joseph P. Stine, Orlando, FL (US)

(72) Inventor: Joseph P. Stine, Orlando, FL (US)

(*) Notice: Subject to any disclaimer, the term of this patent is extended or adjusted under 35 U.S.C. 154(b) by 1218 days.

(21) Appl. No.: 14/211,972

(22) Filed: Mar. 14, 2014

Related U.S. Application Data

(60) Provisional application No. 61/787,887, filed on Mar. 15, 2013.

(51) Int. Cl.
| | |
|---|---|
| *F25D 11/00* | (2006.01) |
| *F25D 17/06* | (2006.01) |
| *F25D 11/02* | (2006.01) |
| *F24F 5/00* | (2006.01) |

(52) U.S. Cl.
CPC .......... *F25D 17/062* (2013.01); *F24F 5/0021* (2013.01); *F25D 11/00* (2013.01); *F25D 11/02* (2013.01); *F25D 11/022* (2013.01); *F25D 11/025* (2013.01); *F25D 11/027* (2013.01)

(58) Field of Classification Search
CPC ...... F25D 17/062; F25D 11/00; F25D 11/025; F25D 11/05; H01L 23/427; H01L 23/467; H01L 23/473
See application file for complete search history.

(56) References Cited

U.S. PATENT DOCUMENTS

| | | | | |
|---|---|---|---|---|
| 4,652,287 A | * | 3/1987 | Allen | F25D 3/12 62/603 |
| 5,343,632 A | * | 9/1994 | Dinh | F26B 21/086 34/507 |
| 6,319,599 B1 | * | 11/2001 | Buckley | A61F 7/02 2/2.15 |
| 2003/0205569 A1 | * | 11/2003 | Chang | A47J 37/0623 219/400 |
| 2004/0011077 A1 | * | 1/2004 | Maidment | A47F 3/0447 62/465 |
| 2007/0146988 A1 | * | 6/2007 | Yamagishi | G06F 1/203 361/679.08 |
| 2008/0196866 A1 | * | 8/2008 | Wu | F25B 39/022 165/104.31 |
| 2009/0310996 A1 | * | 12/2009 | Kanou | G03G 15/2039 399/69 |
| 2010/0296250 A1 | * | 11/2010 | Huang | H05K 7/20518 361/700 |
| 2010/0308257 A1 | * | 12/2010 | Lampe | A23L 3/375 252/71 |
| 2011/0063798 A1 | * | 3/2011 | Denter | H05K 7/20681 361/695 |

(Continued)

*Primary Examiner* — Keith Raymond
(74) *Attorney, Agent, or Firm* — Allen Dyer Doppelt & Gilchrist

(57) ABSTRACT

A supplemental refrigeration heat sink includes a plurality of sealed tubes filled with a compound and arranged so as to extend across the top inside a refrigerated box. The compound is preferably a phase change compound with a melting point proximate to and higher than the average return air temperature. During the cooling phase of the box, the supplemental heat sink tubes are cooled, with the phase change material freezing or nearly freezing. During the heating phase, cooling fans can be secured and the phase change material readily absorbs heat from the box, slowing the temperature rise in the box.

16 Claims, 1 Drawing Sheet

(56) References Cited

U.S. PATENT DOCUMENTS

| | | | |
|---|---|---|---|
| 2011/0283716 A1* | 11/2011 | Newman | F25D 16/00 62/6 |
| 2012/0047917 A1* | 3/2012 | Rafalovich | F25D 11/025 62/66 |
| 2012/0192574 A1* | 8/2012 | Ghoshal | F25B 21/02 62/3.2 |

* cited by examiner

SUPPLEMENTAL REFRIGERATION HEAT SINK AND RELATED SYSTEMS AND METHODS

CROSS-REFERENCE TO RELATED APPLICATION

This application claims the benefit of U.S. Provisional Application Ser. No. 61/787,887, filed on Mar. 15, 2013, the contents of which are herein incorporated by reference in their entirety.

FIELD OF THE INVENTION

The present invention relates to refrigeration units.

BACKGROUND OF THE INVENTION

Refrigeration units operate according to well known principles. Items that a user wishes to keep colder than ambient air temperature are located in a refrigeration volume (referred to herein as the "box") through one or more doors or other openings. Previously compressed and condensed refrigerant is expanded to create a temperature drop in an evaporator, through which air from the box is blown by one or more evaporator fans. The air from the box transfers heat into the refrigerant through the evaporator, and the cooled air is returned to the box. In the box, the cooled air absorbs heat from the box contents and the remaining box air. This is referred to herein as the cooling phase of the box. One or more thermostats measures the temperature in the box, and upon the measured box temperature reaching the required temperature (a low temperature set point), the compressor is turned off, ending the cooling phase.

Although modern insulation has decreased heat gain in the box of refrigeration units, intrusion heat still penetrates the box's insulated walls and doors. Heat also enters the box when doors are opened, particularly when the doors remain open for a long period of time. Regardless of the source of heat, the temperature of the air inside the box will gradually rise after the end of the cooling phase. This period is referred to as the heating phase of the box.

If the evaporator fans are stopped during the heating phase, the heated air naturally rises by convection and collects at the ceiling so that the temperature at the ceiling is greater than the temperature lower in the box. The air on the floor and at the mid level of the box will increase uniformly to a high temperature set point (incorporating some hysteresis relative to the low temperature set point to prevent excessive switching—although typically only a single temperature set point is actually set by the user) to start the cooling phase.

To avoid development of what is often considered to be an undesirable thermal gradient in the box and allow for more accurate control, most refrigeration units will continue to operate the evaporator fan(s) during the heating phase. The air thus circulated is passed through the evaporator where it entrains moisture collected in the condensate pan during the previous cooling phase. Therefore, although the humidity is reduced during the cooling phase, some humidity is returned during the heating phase only to be removed again in the following cooling phase. Thus, operating the refrigeration unit in this way results in additional energy consumption for running the evaporator fans and subsequent removal of humidity returned to the box air.

SUMMARY OF THE INVENTION

In view of the foregoing, it is an object of the present invention to provide a supplemental refrigeration heat sink.

According to an embodiment of the present invention, a supplemental refrigeration heat sink includes a plurality of sealed tubes filled with a compound and arranged so as to extend across the top of a refrigerated box. The compound is preferably a phase change compound with a melting point proximate to and higher than the average box temperature. During the cooling phase of the box, the supplemental heat sink tubes are cooled, with the phase change material freezing or nearly freezing. During the heating phase, the phase change material readily absorbs heat from the box, slowing the temperature rise at the top of the box and obviating the need to run the evaporator fans during the heating phase.

These and other objects, aspects and advantages of the present invention will be better appreciated in view of the drawings and following detailed description of preferred embodiments.

DETAILED DESCRIPTION OF PREFERRED EMBODIMENTS

Figure 1:
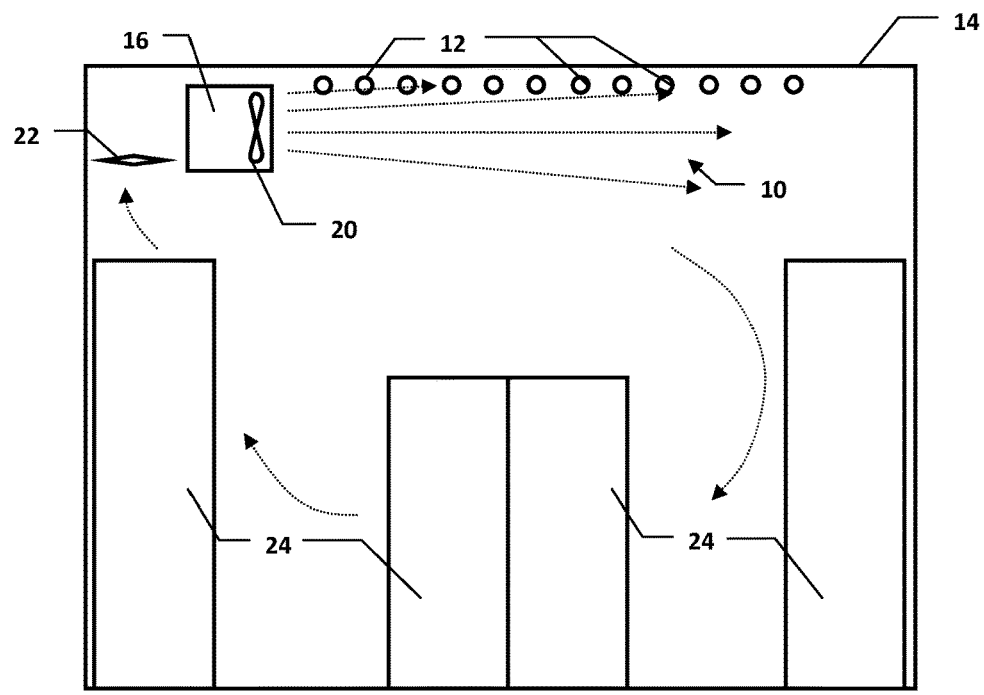
FIG. 1 is a schematic diagram of a supplemental refrigeration heat sink installed in the box of a refrigeration unit and depicted during a cooling phase, according to an embodiment of the present invention.

Referring to FIG. 1, according to an embodiment of the present invention, a supplemental refrigeration heat sink 10 includes a plurality of longitudinally extending tubes 12 (shown in end view in FIG. 1). The tubes 12 are each individually sealed and filled with a compound. The heat sink 10 is installed in the box 14 of a refrigeration unit, preferably with their longitudinal axes perpendicular to the direction of air flow leaving an evaporator 16 (or other cooling element) driven by one or more cooling fans 20.

Advantageously, the tubes 12 are formed of a metal, such as stainless steel or aluminum. In general, the tube material should have a high thermal conductivity and a high resistance to corrosion in connection with the compound and under the anticipated conditions of use. The compound is advantageously a phase change compound, meaning that it has a melting point (and freezing point, which for the phase change compounds employed, is assumed to be approximately equal to the melting point) that is proximate to, but higher than the average air temperature in the box 14 during operation. Most preferably, the melting point of the compound is approximately 3 degrees Fahrenheit (F) higher than the average turn air temperature. "Average return air temperature" should be understood to mean average temperature of air being introduced to the evaporator 16 (or other cooling element) during the cooling phase. Another reference for a preferred melting point of the compound is approximately 10 degrees F. higher than the low temperature set point of the box.

Generally, the goal is to have a material that will wholly or partially melt during the heating phase (and likewise wholly or partially freeze during the cooling phase). Thus, during the heating phase, the compound will absorb heat from the adjacent box air with only a small temperature increase. Because the temperature differential between the compound and the air is a driving force for heat transfer, minimizing any increase in temperature of the compound while absorbing heat will enhance heat transfer.

During a cooling phase (as in FIG. 1), the evaporator 16 is operable to cool air circulated (represented by dotted arrows) through the box 14 by the evaporator fan 20. A thermostat 22 senses the temperature of air returning to the evaporator, and upon a predetermined low temperature being sensed, secures operation of the evaporator 16 (and associated refrigeration unit equipment, such as a compressor, etc.—not shown) and the evaporator fan 20. During the cooling phase, in addition to heat being removed from the contents 24 (such as food, beverages, etc.) by the cold air, the cold air removes heat from the compound in the tubes 12, which undergoes at least partial freezing.

Figure 2:
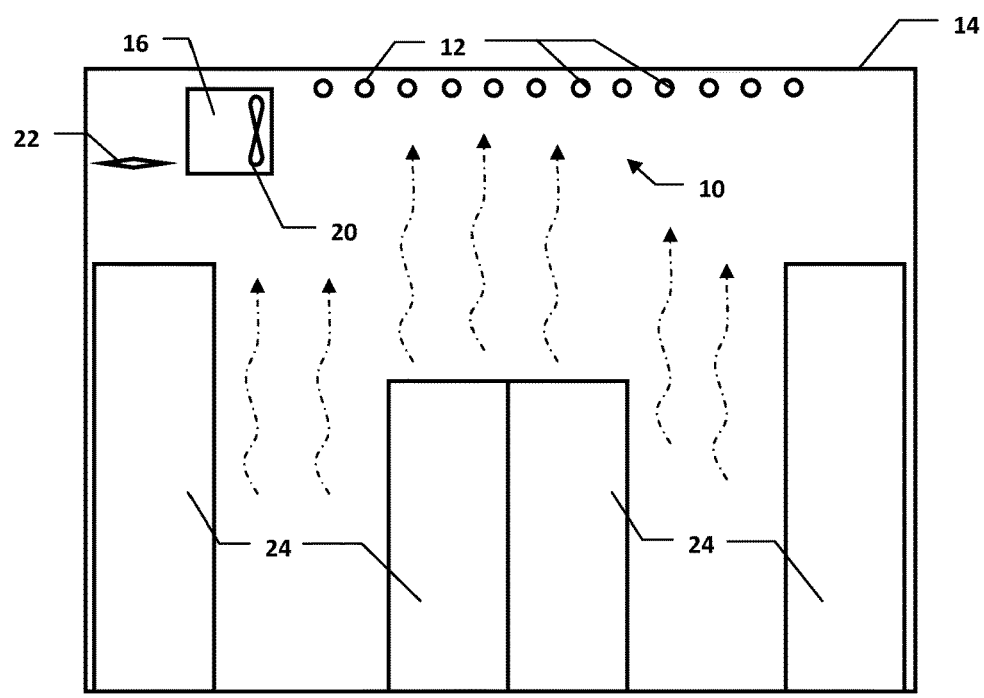
FIG. 2 is a schematic diagram of the supplemental refrigeration heat sink of FIG. 1, depicted during a heating phase.

During a heating phase (as in FIG. 2), the evaporator fan 20 is secured. Unwanted heat input collects in the box 14. Since heat naturally rises and the fan 20 is secured, the unwanted heat tends to accumulate at the top of the box 14 (depicted schematically by dashed arrows), raising the temperature of the air around the tubes 12. The tubes 12 absorb the heat from the air as the heat melts the compound. Since heat is being removed from the air in the vicinity of the tubes 12, the air temperature below increases more slowly than because it is not mixed with the warm ceiling air, delaying the start of the next cooling cycle.

The selection of the compound employed can be very significant. Composition thermal properties, where not already known, can be determined through thermodynamic tests. Significant properties include the specific heat capacity of the compound several degrees above and below the melting/freezing point. A higher specific heat capacity, will require less compound to absorb a desired amount of unwanted heat. The optimal specific heat should be at least approximately three times greater than the specific heat of water; in other words, at least 3 British Thermal Units per degree F.*pound (BTU/(F°—lb)). The thermal conductivity of the compound should also be considered, to identify how quickly the compound can absorb the heat transferred through the tubing wall.

With these properties determined, and the unwanted heat introduction rate into the box being known (typically through previous measurement), the necessary quantity of the compound and the number and dimensions of the tubes 12 can be calculated to achieve a desired delay in the interval between cooling cycles.

The compound can have a uniform molecular composition, although preferably a mixture of different substances is used. A preferred chosen group of substances for mixing includes decanes whose chemical formulae are from $C_{10}H_{22}$ to $C_{19}H_{40}$. By using a less expensive base of liquid paraffin whose melting point is about 32° F. and choosing a decane of a higher melting point the proper mixture can be formulated for the desired melting point temperature. Choosing a mixture also allows the mixture to melt over a range of several degrees of temperature rather than at a single temperature to accommodate temperature variations from box to box in which the heat sink may be employed.

Other properties of the compound also bear consideration. For example, because the flash point of a mixture of liquid paraffin and a decane is greater than 200° F., it is not considered a flammable or combustible liquid. Toxicologically the mixture is only an irritant. Other compounds such as glycerin and propylene glycol will act similarly for lower temperatures below freezing with the benefit of being polar and miscible in water.

It will be appreciated from the foregoing that, by obviating the need to run evaporator fans during the heating phase, power consumption is reduced. Because air is not re-circulated through the evaporator during the heating phase, the humidity can be reduced, which is an improved condition for certain materials in which contents may be stored (e.g., cardboard boxes) and may further reduce power consumption. Also, since motor-driven components like compressors and fans use more energy when starting than while running, increasing the interval between cooling cycles reduces the required motor starts, which can result in an additional reduction in power consumption.

Moreover, these benefits are achieved without the requirement for any moving parts, which would otherwise need to be maintained and/or replaced. The compound-filled tubes, on the other hand, can last indefinitely with no maintenance.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and the claims appended hereto.

What is claimed is:

1. A refrigeration unit comprising:
   a box having a top and enclosing a refrigeration volume;
   a refrigeration system connected with the box and operable to generate and introduce cooled air into the refrigeration volume during a cooling phase, a heating phase occurring after generation of cooled air is stopped;
   a thermostat configured to measure an air temperature within the refrigeration volume and in signal communication with the refrigeration system to initiate the cooling phase upon reaching a high temperature set point and to stop generation of cooled air upon reaching a low temperature set point; and
   a supplemental refrigeration heat sink including at least one sealed tube filled with a phase change compound arranged in the refrigeration volume proximate to the top of the box.

2. The refrigeration unit of claim 1, wherein the refrigeration system includes a cooling element for generating the cooled air by heat exchange therewith and at least one cooling fan for introducing the cooled air into the refrigeration volume.

3. The refrigeration unit of claim 2, wherein the refrigeration system secures the cooling fan during the heating phase.

4. The refrigeration unit of claim 2, wherein the cooling element evaporator.

5. The refrigeration unit of claim 1, wherein a melting point of the phase change compound is approximately 3 degrees Fahrenheit (F) higher than an average return air temperature.

6. The refrigeration unit of claim 5, wherein the phase change compound has a specific heat capacity of at least 3 British Thermal Units per degree F. per pound (BTU/(F°—lb)).

7. The refrigeration unit of claim 1, wherein the at least one sealed tube has a circular cross-section.

8. The refrigeration unit of claim 1, wherein the least one sealed tube is elongated along a longitudinal axis thereof.

9. The refrigeration unit of claim 8, wherein the longitudinal axis of the at least one sealed tube is perpendicular to a direction of cooled air flow through the box.

10. The refrigeration unit of claim 1, wherein the supplemental refrigeration heat sink includes a plurality of additional sealed tubes filled with the phase change compound and arranged in the refrigeration volume proximate to the top of the box.

11. The refrigeration unit of claim 1, wherein the at least one tube is made of metal.

12. The refrigeration unit of claim 1, wherein the phase change compound includes at least one of: a decane, glycerin and propylene glycol.

13. The refrigeration unit of claim 12, wherein the phase change compound includes a mixture of the decane with liquid paraffin.

14. The refrigeration unit of claim 12, wherein the phase change compound further includes water.

15. A method for enhancing temperature control in a refrigeration unit using a supplemental refrigeration heat sink, the method comprising:
  arranging a plurality of sealed tubes filled with a phase change compound in a refrigeration volume of a box, proximate to a top thereof;
  introducing cooled air into the box using at least one fan during a cooling phase, such that the phase change compound releases heat and undergoes at least partial freezing; and
  securing the cooling phase and stopping the at least one fan to initiate a heating phase, during which the phase change compound absorbs heat and undergoes at least partial melting.

16. The method of claim 15, wherein the at least one fan includes a plurality of fans, and all of the plurality of fans are stopped when the cooling phase is secured.

* * * * *